(12) United States Patent
Alsaleem

(10) Patent No.: US 11,314,210 B2
(45) Date of Patent: Apr. 26, 2022

(54) NEUROMORPHIC COMPUTING USING ELECTROSTATIC MEMS DEVICES

(71) Applicant: NUtech Ventures, Lincoln, NE (US)

(72) Inventor: Fadi Alsaleem, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 37 days.

(21) Appl. No.: 16/526,557

(22) Filed: Jul. 30, 2019

(65) Prior Publication Data
US 2020/0041964 A1 Feb. 6, 2020

Related U.S. Application Data

(60) Provisional application No. 62/713,105, filed on Aug. 1, 2018.

(51) Int. Cl.
*G05B 13/04* (2006.01)
*G06N 3/04* (2006.01)
*G05B 13/02* (2006.01)

(52) U.S. Cl.
CPC .............. *G05B 13/04* (2013.01); *G06N 3/04* (2013.01); *G05B 13/027* (2013.01); *G06N 3/049* (2013.01)

(58) Field of Classification Search
CPC ........ G06B 13/04; G06B 13/027; G06N 3/04; G06N 3/049
USPC .......................................................... 700/29
See application file for complete search history.

(56) References Cited

U.S. PATENT DOCUMENTS

| 5,867,302 A * | 2/1999 | Fleming | G02B 26/0841 359/291 |
| 8,168,120 B1 * | 5/2012 | Younis | G01N 29/022 422/82.01 |
| 8,996,141 B1 * | 3/2015 | Alsaleem | F16K 99/0042 700/37 |
| 11,031,937 B2 * | 6/2021 | Nanaiah | H03K 19/21 |

(Continued)

OTHER PUBLICATIONS

Alexander N. Tait et al., "Neuromorphic Silicon Photonic Networks." Princeton University, Princeton, NJ, Jun. 13, 2017.

(Continued)

*Primary Examiner* — Ly D Pham
(74) *Attorney, Agent, or Firm* — Leydig, Voit & Mayer, Ltd.; Gerald T. Gray

(57) ABSTRACT

A continuous-time recurrent neural network (CTRNN) is described that exploits the nonlinear dynamics of micro-electro-mechanical system (MEMS) devices to model a neuron in accordance with a neuron rate model that is the basis for dynamic field theory. Each MEMS device in the CTRNN is configured to simulate a neuron population by exploiting the characteristics of bi-stability and hysteresis inherent in certain MEMS device structures. In an embodiment, the MEMS device is a microbeam or cantilevered microbeam device that is excited with an alternating current (AC) voltage at or near an electrical resonance frequency associated with the MEMS device. In another embodiment, the MEMS device is an arched microbeam device that is excited with a direct current voltage and exhibits snap-through behavior due to the physical design of the structure. A CTRNN can be implemented using a number of MEMS devices that are interconnected, the connections associated with varying connection coefficients.

9 Claims, 12 Drawing Sheets

(56) References Cited

U.S. PATENT DOCUMENTS

| | | | | |
|---|---|---|---|---|
| 2004/0023429 A1* | 2/2004 | Foerstner | ............... | H01G 5/18 438/50 |
| 2007/0063613 A1* | 3/2007 | Elata | ............... | H03H 9/2457 310/306 |
| 2008/0090421 A1* | 4/2008 | Casset | ............... | H01G 5/011 438/703 |
| 2008/0174532 A1* | 7/2008 | Lewis | ............... | G09G 3/3466 345/85 |
| 2010/0201289 A1* | 8/2010 | Pozidis | ............... | G09G 3/3433 318/116 |
| 2011/0164067 A1* | 7/2011 | Lewis | ............... | G09G 3/3413 345/690 |
| 2013/0168782 A1* | 7/2013 | Jahnes | ............... | B81B 3/0013 257/415 |
| 2014/0146435 A1* | 5/2014 | Stephanou | ............... | H01G 5/40 361/290 |
| 2014/0265720 A1* | 9/2014 | El-Gamal | ............... | B06B 1/0292 310/300 |
| 2015/0091911 A1* | 4/2015 | de Groot | ............... | G06T 1/00 345/501 |
| 2016/0006372 A1* | 1/2016 | Elata | ............... | H03H 9/02362 310/300 |
| 2017/0229630 A1* | 8/2017 | Zhan | ............... | H02N 3/00 |
| 2017/0297908 A1* | 10/2017 | Almeida Loya | ............... | B81B 7/02 |
| 2018/0316287 A1* | 11/2018 | Xu | ............... | H02N 2/188 |
| 2019/0020326 A1* | 1/2019 | Alsaleem | ............... | B81B 3/0086 |
| 2019/0354238 A1* | 11/2019 | Akhbari | ............... | G06F 3/0416 |

OTHER PUBLICATIONS

Mehari K. Tesfay et al., "Ctrnn Computing Realization Through Network of Coupled MEMS." Proceedings of the 18th The ASME 2018 International Design Engineering Technical Conferences & Computers and Information in Engineering Conference in Quebec City, Canada, Aug. 26-17, 2017.

Fadi Alsaleem et al., "MEMS as a Continuous Time Recurrent Neuron (CTRN) Computing Unit." Proceedings of the 18th The ASME 2018 International Design Engineering Technical Conferences & Computers and Information in Engineering Conference in Quebec City, Canada, Aug. 26-17, 2017.

Fadi Alsaleem et al., "A MEMS Nonlinear Dynamic Approach For Neural Computing." Submitted to IEEE Journal of Microelectromechanical Systems under JMEMS-2017-0316.R1, Jun. 14, 2018.

* cited by examiner

NEUROMORPHIC COMPUTING USING ELECTROSTATIC MEMS DEVICES

CROSS-REFERENCE TO RELATED APPLICATIONS

This application claims the benefit of U.S. Provisional Application No. 62/713,105 titled "Neuromorphic Computing using Electrostatic MEMS Devices," filed Aug. 1, 2018, the entire contents of which is incorporated herein by reference

BACKGROUND

Enormous amounts of data are generated everyday by various applications and sensor networks, and the need for intelligent devices to process and utilize this data continues to grow. The applications generating data are varied and can include heat ventilation and air conditioning (HVAC) diagnostic systems, smart cars, and robotics, to name a few. Conventionally, these large data processing tasks are executed by parallel computing systems and distributed computing approaches. In some architectures, a number of silicon-based devices (e.g., integrated circuits, chips, processors, etc.) are interconnected and designed to work in concert to achieve a high degree of performance and scalability. However, the high power consumption as well as the complicated thermal management solutions required for CMOS-based logic gates, the fundamental building block of modern digital computing, are a technical issue that may slow down future advances in these fields.

The limitations of current digital silicon technology and the von Neumann architecture has created interest in neuromorphic computing. Neuromorphic computing can refer to using analog and/or digital elements to model (e.g., simulate) the behavior of physiological processes in the neurons of a human brain. Certain advances have been made in simulating the dynamics of a single neuron in a lab setting, creating models of hundreds of billions of neurons, mimicking the behavior of the human brain, is beyond current capabilities and not computationally warranted in most cases. The emergence of a "firing rate theory" enables greater practical applications of these models. The firing rate theory states that the potential across a neuron is related to the firing rate of the neuron. The model can be further simplified by grouping biologically similar and proximate neurons into a single self-excited rate neuron model, referred to as a recurrent neuron (RN) model, which can be used as a building block to construct recurrent neural networks (RNNs).

RNNs, unlike traditional feed-forward neural networks (FFNNs), utilize internal memory through self-feedback to preserve the sequences of input data during training. Thus, the RNNs have shown great success in sensor applications such as image, video, and audio processing, as well as in optimization, associative memories, and controls. A special, et very complex form of an RNN, known as a continuous-time recurrent neural network (CTRNN), uses differential equations to describe activation levels of the neurons. To perform a certain classification problem, the self-coupling and cross-coupling weights between different neurons of a CTRNN are determined through the training performed during the design phase of the network.

CTRNNs have recently emerged as a very attractive machine learning option as they require fewer neurons for high-level learning. For example, a CTRNN that includes only four CTRNs is sufficient to learn eight wrist trajectories from acceleration measurements, where 128 RNs were needed to perform a similar task. However, CTRNNs are computationally expensive for real-time implementation as they require simultaneous solutions of highly-coupled multiple differential equations. This characteristic makes the CTRNN unsuitable for many applications such as wearable devices with limited memory and processing capabilities.

SUMMARY

A CTRNN is described that exploits the nonlinear dynamics of micro-electro-mechanical system (MEMS) devices to model a CTRN. Each MEMS device in the CTRNN is configured to simulate a neuron by exploiting the characteristics of bi-stability and hysteresis inherent in certain MEMS device structures. A CTRNN can be implemented using a number of MEMS devices that are interconnected, the connections associated with varying connection coefficients and/or biased by appropriate bias voltages. Various systems or apparatus can then be implemented to include the CTRNN to replace separate subsystem components that performed sensing and processing of the sensor data.

In some embodiments, a CTRNN includes a MEMS device that includes an electrode and a microbeam offset from the electrode. The MEMS device is associated with non-linear dynamics that cause the MEMS device to exhibit a bi-stable response to an input signal. A voltage source connected to the MEMS device and configured to apply a bias voltage to the MEMS device In an embodiment, the microbeam is a cantilevered microbeam and the voltage source is configured to apply an alternating current (AC) voltage to the MEMS device at a frequency proximate an electrical resonance frequency associated with the MEMS device. In an embodiment, a frequency response of the MEMS device corresponding to the AC voltage at the frequency has a gain of at least 20 decibels.

In an embodiment, the microbeam is an arched microbeam and the voltage source is configured to apply a direct current (DC) voltage to the MEMS device. In an embodiment, the microbeam is any microbeam that exhibits pull-in and pull-out behavior and the voltage source is configured to apply a direct current (DC) voltage to the MEMS device.

In an embodiment, the CTRNN further includes an operational amplifier and at least one resistor configured to adjust a gain associated with a signal connected to the op amp. The signal comprises an activation level associated with a second MEMS device. The gain is configured to attenuate the signal to approximate a connection coefficient corresponding to a connection between the MEMS device and the second MEMS device.

In an embodiment, a proof mass is coupled to the microbeam, and the proof mass includes a number of fingers attached thereto. The MEMS device further includes one or more conductive structures having corresponding sets of fingers attached thereto. The corresponding sets of fingers for each conductive structure in the one or more conductive structures are disposed proximate to a subset of fingers attached to the proof mass. In an embodiment, each conductive structure is connected to a corresponding signal that represents an activation level for a separate MEMS device in one or more additional MEMS devices. In an embodiment, each additional MEMS device includes a proof mass. The gain associated with the signal for a particular additional MEMS device is based on a number of fingers for the particular additional MEMS device.

In an embodiment, the CTRNN includes a sensor layer, a recurrent neural layer, and an output layer. Each of the sensor layer, the recurrent neural layer, and the output layer include at least one MEMS device.

In an embodiment, the MEMS device is connected to an input signal from at least one additional MEMS device included in the sensor layer, and an output signal of the MEMS device is connected to at least one further MEMS device included in the output layer.

In some embodiments, an apparatus includes a substrate, a plurality of MEMS devices formed in the substrate, and one or more voltage sources connected to circuit components formed in the substrate. The plurality of MEMS devices are configured to implement a continuous-time recurrent neural network. The voltage sources supply a voltage to one or more of the MEMS devices in the plurality of MEMS devices. At least one MEMS device is coupled to at least one corresponding MEMS device such that the coupled MEMS devices exhibit neural behavior in accordance with a neuron rate model.

In an embodiment, each MEMS device of the plurality of MEMS devices includes a microbeam. A corresponding voltage source of the one or more voltage sources is configured to apply an alternating current (AC) voltage to the MEMS device at a frequency proximate an electrical resonance frequency associated with the MEMS device.

In an embodiment, each MEMS device of the plurality of MEMS devices includes an arched microbeam. The voltage source of the one or more voltage sources is configured to apply a direct current (DC) voltage to the MEMS device.

In an embodiment, each MEMS device includes a proof mass coupled to a microbeam and one or more conductive structures connected to corresponding sets of fingers that extend from the conductive structures. The proof mass includes a number of fingers that extend perpendicular to a direction of travel of the proof mass. The corresponding sets of fingers for each conductive structure in the one or more conductive structures disposed proximate to a subset of fingers attached to the proof mass. The one or more conductive structures are fixed relative to the substrate. In an embodiment, each conductive structure is connected to a corresponding signal that represents an activation level for a separate MEMS device in the plurality of MEMS devices. The gain associated with the signal for a particular MEMS device is based on a number of fingers controlled by the particular MEMS device.

In some embodiments, a system includes a threshold sensor configured to generate a signal based on the state of an environmental input and a plurality of MEMS devices configured to implement a CTRNN that generates an output signal. The signal from the threshold sensor is connected to at least one MEMS device in the plurality of MEMS devices.

In an embodiment, the system further includes a power unit configured to provide one or more voltage sources to the plurality of MEMS devices and a transceiver configured to communicate the output signal to a node of a wireless mesh network.

In an embodiment, the threshold sensor and the plurality of MEMS devices are included in a wearable device.

In an embodiment, the threshold sensor is included within a particular MEMS device in the plurality of MEMS devices.

In an embodiment, a first subset of MEMS devices in the plurality of MEMS devices are included in a recurrent neural layer of the CTRNN and a second subset of the MEMS devices in the plurality of MEMS devices are included in an output layer of the CTRNN. Each MEMS device in the first subset of MEMS devices is configured to include a self-excitation feedback loop.

DETAILED DESCRIPTION

Figure 1A:
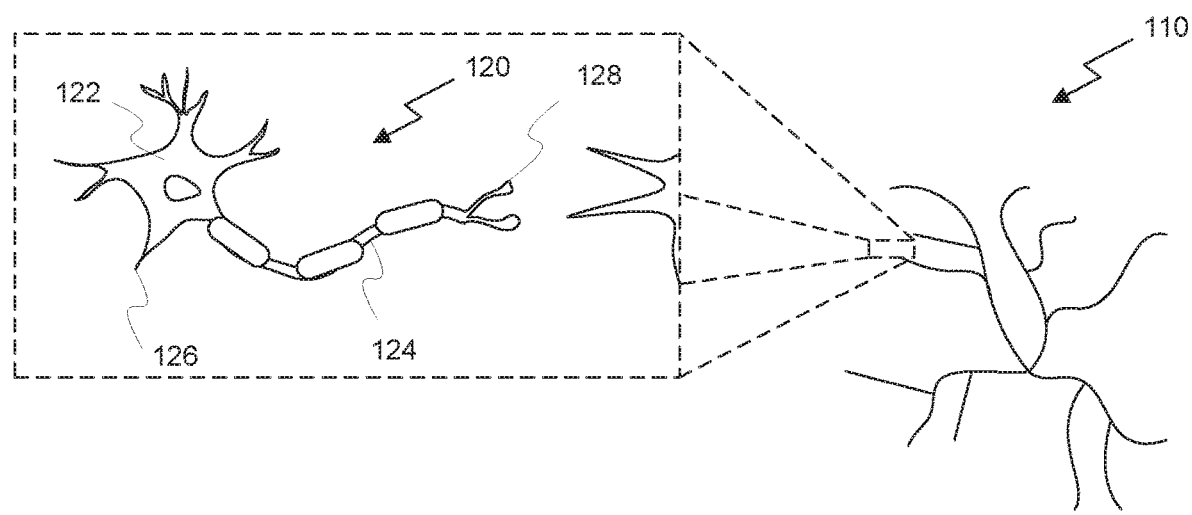
FIG. 1A illustrates a neural population, as is well-known in the art.

A biological neuron is a structure of the nervous system that includes a central cell body referred to as a soma. The soma is connected to an axon that transmits a signal to a target cell through a synapse. The soma can also include zero or more dendrites that provide stimulus to the soma, which can trigger the signal to be transmitted through the axon. In some cases, the target cell is a skeletal muscle cell, a gland cell, a smooth muscle cell, or the like. However, in other cases, the target cell can be a different neuron. Where a neuron has more than one dendrite, multiple stimuli from other neurons can provide stimulus which are combined within the soma to trigger the signal transmitted via the axon. The stimuli from different neurons can be excitatory or inhibitory, which are combined to change the potential within the soma, leading to signals of varying levels being fired down the axon.

A collection of neurons with similar firing rates can be referred to as a neural population. A biological network can be modeled by a simpler network made from a group of neural populations. This model can be mathematically represented as an RNN. Furthermore, the signal dynamics of a neural population can be simulated using a micromechanical electrical system (MEMS) device. Consequently, a continuous time RNN (CTRNN) can be implemented using a network of interconnected MEMS devices, thereby forming a neuromorphic computing system.

In a conventional system, MEMS devices can be utilized within a system to generate sensor signals. These sensor signals are then digitized (e.g., through an amplifier and analog-to-digital converter (ADC)) and provided to a digital processor, such as a CMOS-based device. The digital signals are provided as inputs to an implementation of a neural network that utilizes a large number of computations (e.g., floating-point multiply-accumulate calculations) to process the inputs and generate an output of the neural network. The output can then be used to perform an additional task, such as alert a program to a condition (e.g., set an alert for a user) or control an actuator such as an axis of a robotic arm.

In contrast, a network of MEMS devices can be designed to perform the sensing and computation directly within the network of MEMS devices. The implementation of the network implements the equivalent to a CTRNN in the CMOS-based logic devices, where the result can be obtained much more quickly and with much lower power consumption requirements. The ability to implement the computation within the network of MEMS devices exploits the similarities between the behavior of the MEMS devices under certain operating conditions and a CTRN.

In some embodiments, an electrical circuit that includes a MEMS device is configured to operate in a manner that simulates a recurrent neuron in accordance with a neuron rate model associated with dynamic field theory. The MEMS device can be excited with an alternating current (AC) signal (e.g., voltage) at a frequency proximate an electrical resonance frequency of the electrical circuit. By operating the MEMS device using an AC signal at the frequency proximate the electrical resonance frequency of the electrical circuit, the MEMS device exhibits bi-stable behavior that simulates a mathematical model of a recurrent neuron.

In other embodiments, the MEMS device relies on an arched structure of a component that causes the MEMS device to exhibit bi-stable behavior. Because the microbeam is arched, a DC voltage applied above a threshold voltage will cause the microbeam to snap through an equilibrium point and collapse on the electrode. In such embodiments, the MEMS device can operate using a DC signal rather than the AC signal.

In other embodiments, a pull-in/pull-out characteristic in an electrostatic MEMS device can produce the required bi-stable behavior. For example, applying a DC bias voltage to the MEMS device causes deflection of the microbeam and changes the stiffness of the microbeam. At some threshold voltage, the system becomes unstable such that a small deflection towards the electrode will cause the stiffness to transition from negative to positive, causing collapse of the microbeam towards the electrode. The DC bias voltage is reduced below the pull-in voltage to a pull-out voltage that is less than the pull-in voltage to release the proof mass. The difference between the pull-in voltage and the pull-out voltage causes a hysteresis that results in bi-stable behavior.

A network of interconnected MEMS devices can be configured to implement a CTRNN. Consequently, both sensing and processing tasks can be performed by a network of MEMS devices rather than using the MEMS devices only for sensing and then using a processor or microcontroller for subsequent processing or analysis tasks. The structure of the CTRNN and the tuning of the gains associated with interconnections between the MEMS devices enables a wide variety of complex tasks to be performed strictly within the network of MEMS devices.

FIG. 1A illustrates a neural population 110, as is well-known in the art. The neural population 110 includes a number of neurons 120 having a similar firing rate. Each neuron 120 can include a soma 122, an axon 124, and a number of dendrites 126. Stimuli interact with the dendrites 126, which causes ions to flow through gates in the neuron's membrane that changes the membrane potential of the soma 122. The membrane potential refers to a concentration gradient of ions in the fluid within the soma 122 compared to the extracellular fluid outside of the soma 122 (e.g., a voltage potential gradient across the membrane of the cell caused by a differential in ion concentrations) which results in a polarization of the neuron 120 due to the electrical charge associated with the ions. At rest, the neuron 120 has a resting membrane potential of approximately −70 millivolts (mV) due to the concentration of sodium ions, potassium ions, chloride ions, and proteins across the membrane.

An action potential (e.g., an electrical impulse that travels down the axon 124) is a temporary shift in the membrane potential from negative to positive, which triggers a signal to be sent down the axon 124. Neurons 120 typically have a negative resting membrane potential maintained by the neuron 120. However, the presence of the stimuli, such as neurotransmitters proximate receptors on the dendrites 126, cause sodium gates in the membrane to open. Sodium ions are positively charged particles that flow from the extracellular fluid into the fluid in the soma 122 making the membrane potential less negative. As the negative membrane potential is reduced, the neuron 120 is de-polarized. If the stimuli is strong enough (e.g., if sufficient neurotransmitters are present) then the membrane potential passes a threshold (approximately −55 mV), which triggers the firing of the action potential down the axon 124. More specifically, sodium gates proximate the axon 124 open allowing positive sodium ions in the soma 122 to flow into the negatively charged axon 124, which depolarizes the axon 124 proximate the soma 122 and causes a chain reaction along the axon 124 until the signal reaches an axon terminal 128 at the distal end of the axon 124, causing neurotransmitters to be released into the extracellular fluid in a synapse that stimulates a target cell proximate the axon terminal 128. As the membrane potential in the soma 122 becomes positive, the sodium gates close and potassium gates open, allowing potassium ions to flow from the soma 122 back into the extracellular fluid, thereby allowing the membrane potential to return back to the resting membrane potential and allowing the gates to close. Other mechanisms, such as ion pumps and leakage gates, allow the slow exchange of ions over time to maintain the resting membrane potential absent external stimuli.

Detection, memory, and selection behaviors make up the basic building blocks for functions ranging from cognition to complex human behavior. Detection behavior refers to how a certain sensory input, received by the central nervous system, can trigger an event (such as motor action) once the input exceeds a threshold value. Memory behavior refers to how a memory neuron can maintain the effects of a strong stimulus after it is no longer present in order to determine future events. Selection behavior refers to how the brain favors a certain event over another event. In the rate model, the base for a recurrent neuron model, a model was developed where a neuron's internal activation level is postulated to evolve continuously over time to generate behaviors by interacting with neurons, including interactions with itself, to receive a continuous feed of sensory information.

Figure 1B:
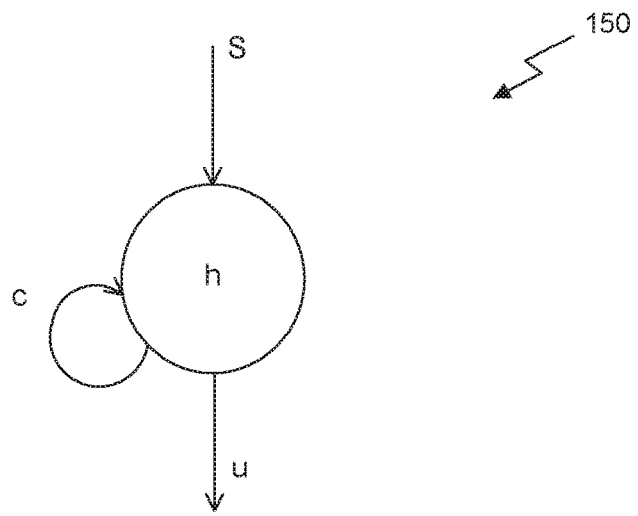
FIG. 1B is a schematic illustration of a model for a single recurrent neuron in accordance with a single rate model neuron, as is well-known in the art.

FIG. 1B is a schematic illustration of a model 150 for a single recurrent neuron in accordance with the rate model, as is well-known in the art. The model 150 represents the firing rate (average) of the activation level for a neuron, such as neuron 120 of FIG. 1A. The activation level time rate of change, u̇, is a function of the resting membrane potential, h, the sensory input, S, and a self-excitation feedback, c. The model 150 also depends on a time constant, τ, for the neuron 120 and a Sigmoid interaction function g(u), as shown in Equation 1:

$$\tau \dot{u} = -u(t) + h + S(t) + cg(u) \quad \text{(Eq. 1)}$$

The Sigmoid interaction function is given in Equation 2:

$$g(u) = \frac{1}{1 + e^{-u(t)}} \quad \text{(Eq. 2)}$$

The neuron's self-excitation develops a potential energy of a double-well type having two stable regions separated by an unstable region, which creates a hysteresis when reacting to a stimulus. In a first stable region, the neuron has a stable low activation value, referred to as an OFF state. As the sensory input increases, another stable state, referred to as an ON state, exists where a high activation level and a stable attractor co-exist. As the activation passes through a threshold value, detection instability causes the activation level to rapidly increase as the ON state is reached. When the stimulus is removed, the activation level returns to the OFF state via a separate path, due to the hysteresis, that prevents the neuron from immediately going to the OFF state.

Figure 2:
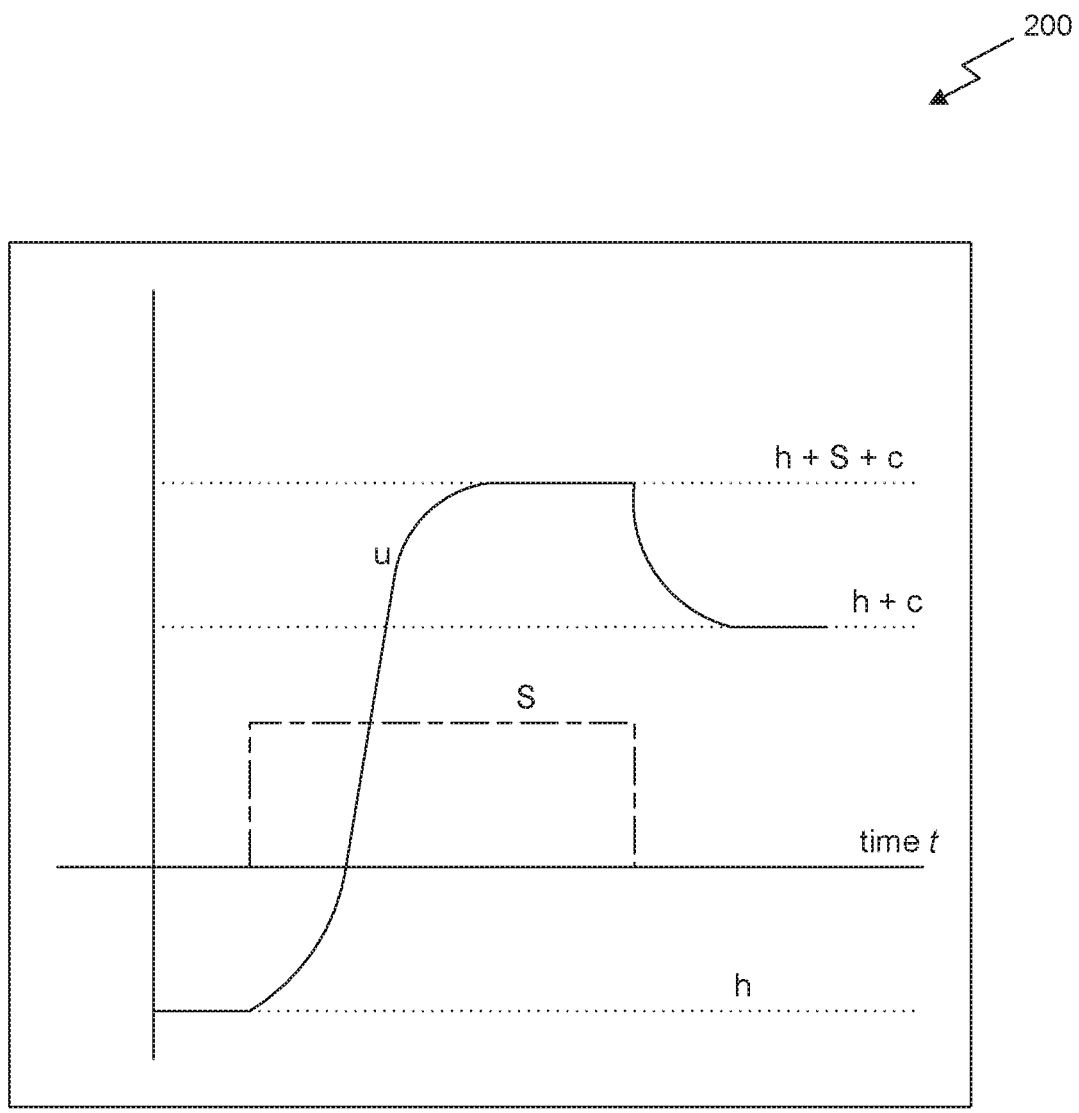
FIG. 2 is a chart that illustrates how the activation state of the model changes in response to a stimulus input, in accordance with some embodiments.

FIG. 2 is a chart 200 that illustrates how the activation state of the model 150 changes in response to a stimulus input, in accordance with some embodiments. As shown in FIG. 2, as the stimulus is applied, the activation level increases until a point at which the detection instability is reached and the ON state is entered. The activation level reaches a steady state where the activation level is equal to the sum of the resting membrane potential h, the self-excitation feedback c, and the sensory input S. As the sensory input is removed, the activation level returns to a lower level equal to the sum of the resting membrane potential h and the self-excitation feedback c. A memory neuron can be modeled by assuming that the self-excitation gain c is large enough that the neuron is trapped in the ON state even after the stimulus is removed, continuing to fire due to the self-excitation feedback loop. As the self-excitation gain c is reduced, the model 150 behaves more like previous neuron models that include the hysteresis but return to the OFF state when the sensory input S is removed.

Figure 3:
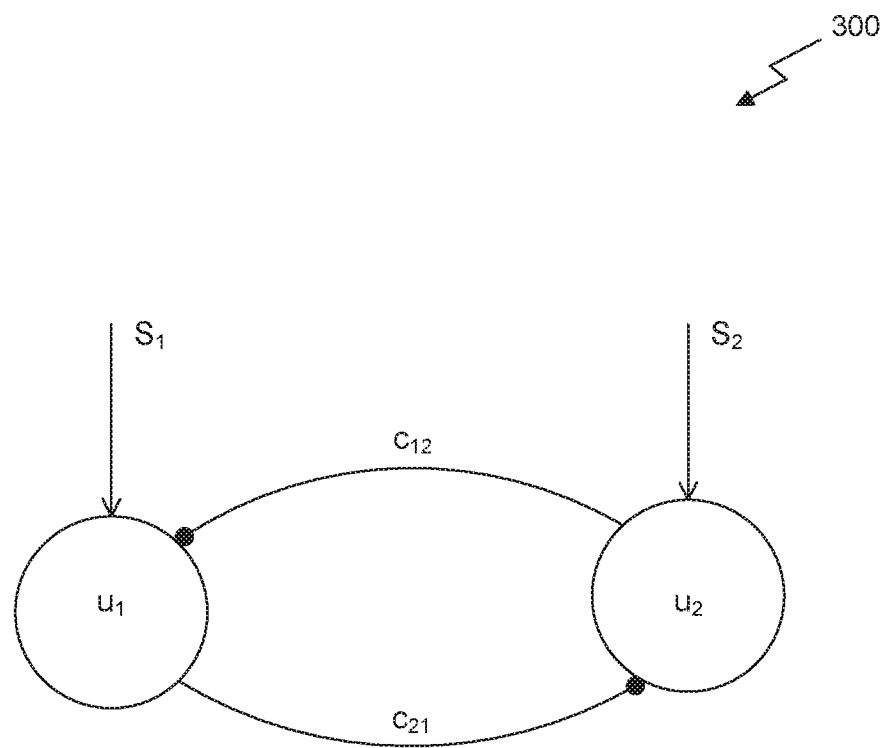
FIG. 3 illustrates a model for a pair of neurons exhibiting inhibitory coupling, in accordance with some embodiments.

FIG. 3 illustrates a model 300 for a pair of neurons exhibiting inhibitory coupling, in accordance with some embodiments. The dynamics of the paired neurons exhibits excitatory input from the sensory input, S, and inhibitory coupling from the excitation feedback, c, of the paired neuron. The coupling between the pair of neurons can be used to explain more advanced behaviors such as the selection process, during which global inhibition maintains one peak due to a particular sensory input while suppressing other sensory inputs. The behavior can be modeled by Equations 3 and 4:

$$\tau \dot{u}_1 = -u_1(t) + h + S_1(t) + c_{12} g(u_1) \quad \text{(Eq. 3)}$$

$$\tau \dot{u}_2 = -u_2(t) + h + S_2(t) + c_{21} g(u_2) \quad \text{(Eq. 4)}$$

Depending on the relative strengths of the inhibitory coupling gains, $c_{12}$ and $c_{21}$, the pair of neurons can exhibit behavior that favors the selection of one input over the other input. In other words, the activation level of each neuron depends on the sensory input to that neuron as well as the activation level of the coupled neuron, and the relative difference between the inhibitory coupling gains can model selection behavior.

Figure 4:
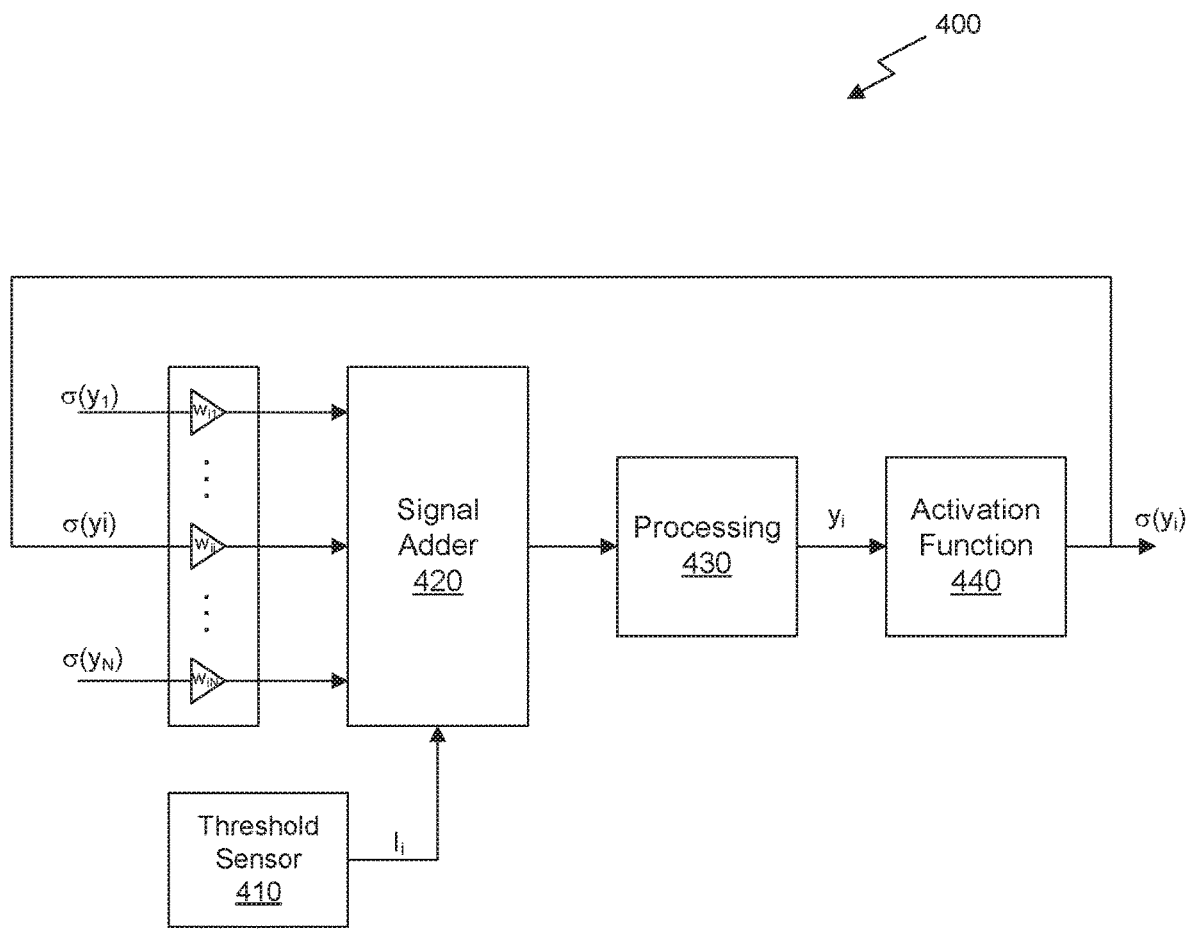
FIG. 4 is a schematic illustration of a CTRN, in accordance with some embodiments.

FIG. 4 is a schematic illustration of a continuous-time recurrent neuron (CTRN) 400, in accordance with some embodiments. A CTRN is a basic building block of a CTRNN and is analogous to a perceptron in a basic feed-forward neural network. The dynamics of the CTRNN, which is comprised of a plurality of CTRNs 400, is given by Equation 5:

$$\dot{y}_i = f_i(y_1, y_2, \ldots, y_N) = \frac{1}{\tau_i}\left(-y_i + \sum_{j=1}^{N} w_{ij}\sigma(y_j) + \theta_i + I_i\right), \quad \text{(Eq. 5)}$$

where i is the index of a particular neuron and j is the index of a neuron that is coupled to the particular neuron, σ represents an activation function (e.g., the Sigmoid function of Equation 2), and $I_i$ is the sensory input for the particular neuron, $\tau_i$ is a time constant for the particular neuron, and $y_i$ is the state of the particular neuron. Each of the activations from a neuron coupled to the particular neuron is attenuated or amplified by the connection coefficient $w_{ij}$, and $\theta_i$ represents a bias level for the particular neuron.

The CTRN 400 can be represented as a system where activations from one or more coupled neurons σ($y_j$), multiplied by a connection coefficient $w_{ij}$, are summed with the sensory input signal $I_i$ from a threshold sensor 410. The one or more coupled neurons σ($y_j$) includes a feedback loop from the particular neuron σ($y_i$), multiplied by a self-excitation connection coefficient, $w_{ii}$.

In an embodiment, the threshold sensor 410 can be implemented as a MEMS device where the input signal $I_i$ represents the output of the MEMS device due to, e.g., an acceleration in the case of a MEMS accelerometer. The input signal $I_i$ represents, e.g., the dynamics of the MEMS device in response to environmental conditions. A signal adder circuit 420 sums the weighted components of the activation levels from N coupled neurons, including a self-excitation feedback signal where the output of the activation function 440 for the particular $i^{th}$ neuron is provided as feedback to an input to the signal adder circuit 420, multiplied by weight $w_{ii}$. A processing circuit 430 combines the output of the signal adder circuit 420 to generate the state for the neuron $y_i$, which is processed by the activation function 440 to generate an activation level for the neuron. The processing circuit 430 can incorporate the bias level $\theta_i$ and an internal memory of the current state through a hidden self-feedback loop, which also incorporates the time constant. In some embodiments, the processing circuit 430 represents computation of a set of differential equations performed through the dynamic response of the MEMS device. For example, acceleration of a proof mass and electrostatic forces acting on the microbeam of a MEMS device through the coupled signals from connected MEMS devices change the activation level of the MEMS device in a manner that simulates solving of the set of differential equations in real-time. The activation function 440 simulates a traditional activation function of neural networks due to the bi-stable behavior of the MEMS device.

Due to the non-linear, self-connection term in Equation 5, the CTRN 400 exhibits complex dynamics such as a double-potential-well behavior that allows the CTRN 400 to simulate the complex behavior of human cognition.

Electrostatic MEMS Device

Figure 5:
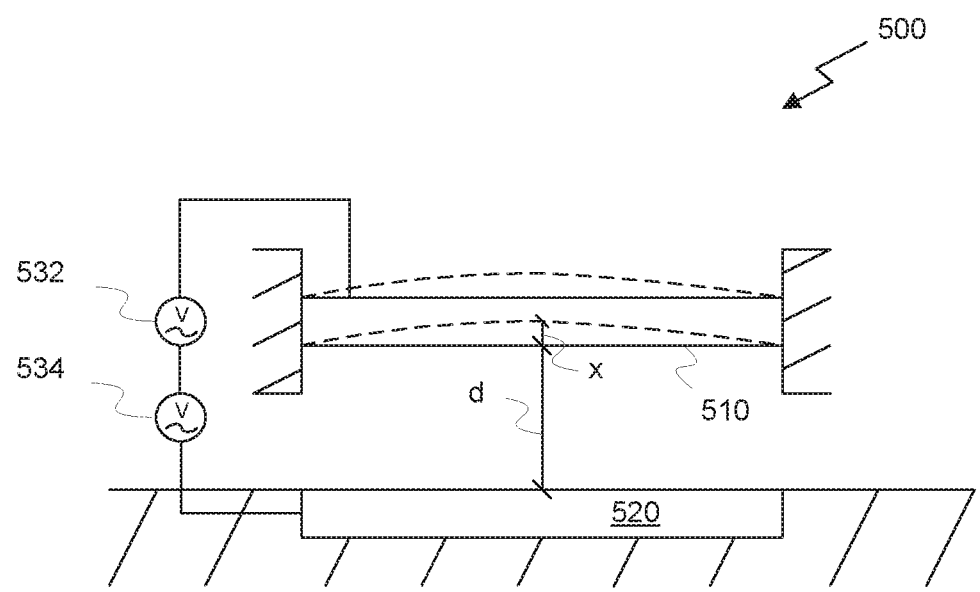
FIG. 5 illustrates a parallel plate electrostatic MEMS device, in accordance with some embodiments.

FIG. 5 illustrates a parallel plate electrostatic MEMS device 500, in accordance with some embodiments. As depicted in FIG. 5, the MEMS device 500 includes a microbeam 510 with fixed ends disposed over a stationary electrode 520. Voltage sources 532, 534 can create a charge on the microbeam 510 and a corresponding charge on the stationary electrode 520. The structure is equivalent to a parallel-plate capacitor with a nominal air-gap of width d between the plates, and the charges on the plates can create a force along the microbeam 510 that generates a deflection of the microbeam 510 having magnitude, x. The electrostatic force due to the charge will cause the microbeam to flex towards the electrode 520.

In an embodiment, the voltage source 532 provides a DC voltage that acts as a bias voltage and the voltage source 534 provides an AC voltage that causes a periodic change in the electrostatic force experienced by the microbeam 510. The MEMS device 500 can be modeled as shown in Equation 6:

$$m_{eff}\ddot{x} + c(x)\dot{x} + kx = F_e, \quad (\text{Eq. 6})$$

where $c(x)$ is a nonlinear squeeze film damping, k is a linear stiffness coefficient, $x(t)$ is the out of plane position, $F_e$ is the electrostatic force, and $m_{eff}$ is the effective mass of the microbeam 510. The electrostatic force $F_e$ acting on the MEMS device 500, ignoring the fringe fields between the microbeam 510 and the electrode 520, is governed by Equation 7:

$$F_e = \frac{\varepsilon A_s V_{MEMS}^2}{2(d-x)^2}, \quad (\text{Eq. 7})$$

where $\varepsilon$ is the permittivity constant, $A_s$ is the overlapping surface area between the microbeam 510 and the electrode 520, $V_{MEMS}$ is the voltage across the MEMS device, and d is the nominal gap between the microbeam 510 and the electrode 520. The parallel plate capacitance of the MEMS device 500 is given by Equation 8:

$$C_{MEMS} = \frac{\varepsilon A_s}{d-x} \quad (\text{Eq. 8})$$

In the MEMS device 500 of FIG. 5, the microbeam 510 is biased by a DC electrostatic load, $V_{DC}$. The DC voltage deflects the microbeam 510 toward the electrode 520, and there is an upper limit for the DC voltage, beyond which the mechanical restoring force is unable to overcome the opposing electrostatic force. This leads to a collapse of the structure, which can be referred to as the pull-in instability. This nonlinear instability can be explained by a saddle-node bifurcation in a potential energy plot of the MEMS device 500 where no fixed point exists after the unstable solution destroys the stable solution. Typical operation of the MEMS device 500 does not allow for bi-stable states; however, the electrical properties of a circuit that includes the MEMS device can be used to create electro-mechanical feedback that enables bi-stability.

Figure 6:
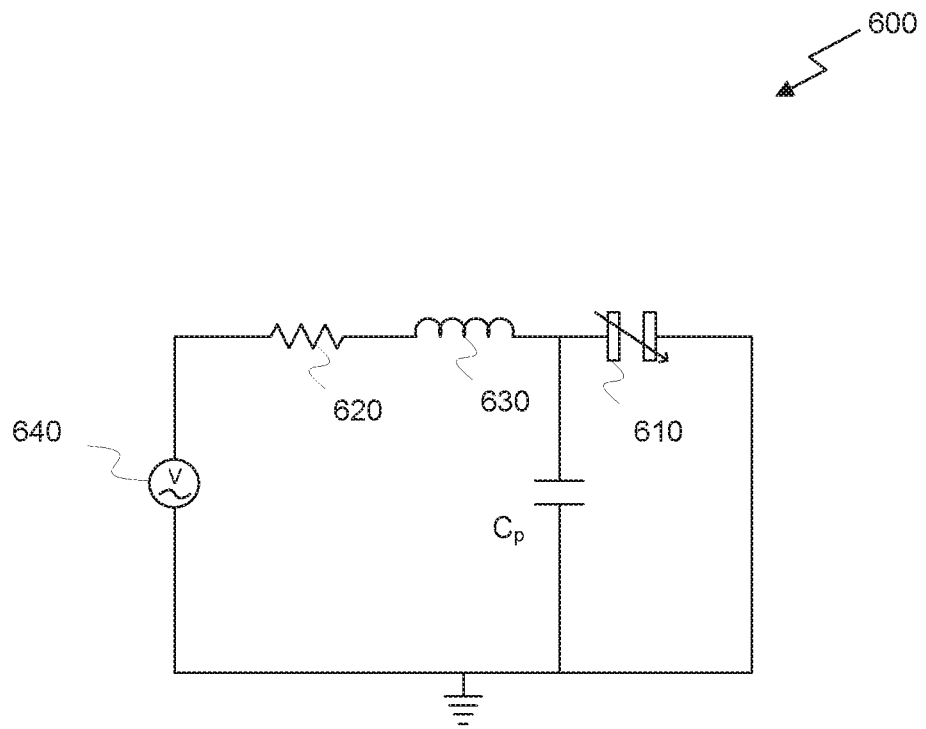
FIG. 6 illustrates an electrical circuit that includes a MEMS device, in accordance with some embodiments.

FIG. 6 illustrates an electrical circuit 600 that includes a MEMS device 610, in accordance with some embodiments. The MEMS device 610 can be a cantilever beam MEMS device, which can be modeled as a spring-mass-damper mechanical system as well as a capacitor due to the charge between an electrode and the surface of the cantilever beam. The cantilever beam MEMS device 610 is similar to the MEMS device 500 of FIG. 5, except only one end of the microbeam 510 is fixed relative to the surface of the electrode 520.

As depicted in FIG. 6, the electrical circuit 600 is a simple RLC circuit that includes a resistor 620, an inductor 630, and the MEMS device 610 (acting as a capacitor). The MEMS device 610 can also be associated with a parasitic capacitance, $C_p$, due to the electrical connections between the circuit and the components of the MEMS device 610.

The electrical circuit is connected to a voltage source 640. The resistor 620 can be a combined resistance due to the internal impedance of the voltage source 640 as well as the impedance of the interconnects used to connect the voltage source 640 to the inductor 630 and/or MEMS device 610.

The MEMS device 610 has a mechanical resonance frequency $\omega_m$ based on the physical arrangement of components and an electrical resonance frequency $\omega_e$ based on the electrical characteristics of the RLC circuit. More specifically, any charge on the surface of the electrode and the surface of the cantilever microbeam results in a force acting on the cantilever microbeam of the MEMS device 610 that causes a deflection of the cantilever microbeam. The deflection of the microbeam in the presence of a continuously changing force due to the electrical field created by the charge is characterized in accordance with the physical structure of the microbeam, including the dimensions of the microbeam, the material the microbeam is constructed of, and so forth. The distribution of mass throughout the structure of the microbeam as well as the material properties such as Young's modulus of elasticity dictate the mechanical resonance frequency such that an AC voltage supplied to the MEMS device 610 causes a corresponding periodic deflection of the microbeam. As the frequency of the AC voltage increases towards the mechanical resonance frequency, the peak amplitude of the deflection increases in accordance with a gain associated with the mechanical resonance frequency and has a maximum amplitude at the mechanical resonance frequency.

As the frequency of the AC voltage moves past the mechanical resonance frequency, the peak amplitude of the deflection is attenuated such that, as the frequency of the AC voltage approaches the electrical resonance frequency, the deflection of the microbeam of the MEMS device 610 is quasi-static and has a magnitude that corresponds with an effective DC voltage of the AC input signal that is amplified due to the resonant response. A gain associated with the frequency of the AC voltage can be calculated by comparing a ratio of the effective DC voltage to the root-mean-squared value of the AC voltage. The effective DC voltage refers to the DC voltage that would cause the same deflection in the cantilever microbeam. Common values for the gain associated with the frequency response proximate the electrical resonance frequency can be greater than 5 and in some cases over 20 (e.g., 26). In an embodiment, the electrical circuit 600 is configured such that a gain at the electrical resonance frequency is at least 20 decibels (e.g., a gain of 10). It will also be appreciated that the electrical resonance frequency is significantly higher than the mechanical resonance frequency (e.g., 10 kHz compared to 200 Hz) such that the MEMS device 610 response to an electrical excitation signal having a frequency proximate the electrical resonance frequency is quasi-static.

Bi-stability is introduced by exciting the MEMS device 610 with an AC voltage at a frequency proximate the electrical resonance frequency of the circuit through the following cycle: (1) the MEMS deflection increases due to voltage amplification at resonance, (2) the capacitance of the MEMS device changes, (3) the electrical resonance frequency shifts, (4) the voltage amplification across the MEMS parallel plate reduces, and (5) the cycle repeats until the MEMS may reach another stable position. The sigmoid-like function due to electrical resonance is as follows:

$$g(x) = \frac{V(\beta(x) - 1)}{\beta(x)}, \quad \text{(Eq. 9)}$$

where $\beta$ is the electrical resonance amplification gain, which is a function of the circuit electrical damping condition, the deflection of the MEMS device, and the difference between the input voltage frequency and the electrical resonance frequency.

In an exemplary embodiment, the physical properties of the MEMS device 610 are as follows: a length of the microbeam is 9 mm, a width of the microbeam is 5.32 mm, a thickness of the microbeam is 150 μm, an initial gap between the microbeam and the stationary electrode is 42 μm, and a linear stiffness of the microbeam is 215 N/m. This results in a primary mechanical resonance frequency of 195 Hz. The electrical resonance frequency, in radians per second, of the electrical circuit 500 is given as the inverse of the square root of the inductance L multiplied by the capacitance C. Given a value of 10 pF for the variable capacitance of the MEMS device 510 and an inductance of 27 mH, the electrical resonance is approximately 9.7 kHz based on the conversion of 1 Hz equal to 2π rad/sec. It will be appreciated that the actual electrical resonance frequency can depend significantly on the parasitic capacitance and parasitic resistance of the electrical circuit caused by the interconnections made between the various components of the electrical circuit as well as the internal resistance of the voltage source, and the like. Consequently actual electrical resonance frequencies of the electrical circuit can be higher than 10 kHz (e.g., 60 kHz). Furthermore, the bandwidth of the frequency response depends on the value of the resistance R as higher resistance results in lower signal gain but wider bandwidth.

Arched MEMS Device

In the embodiments described above, bi-stability of the MEMS device 610 is enabled by exciting the MEMS device 610 with an AC voltage at a frequency proximate the electrical resonance frequency of the circuit. Bi-stability is essential to simulating the neurological behavior of a CTRN neuron. However, this bi-stability characteristic is also inherently present in some specific MEMS device structures, such as an arched MEMS device.

Figure 7:
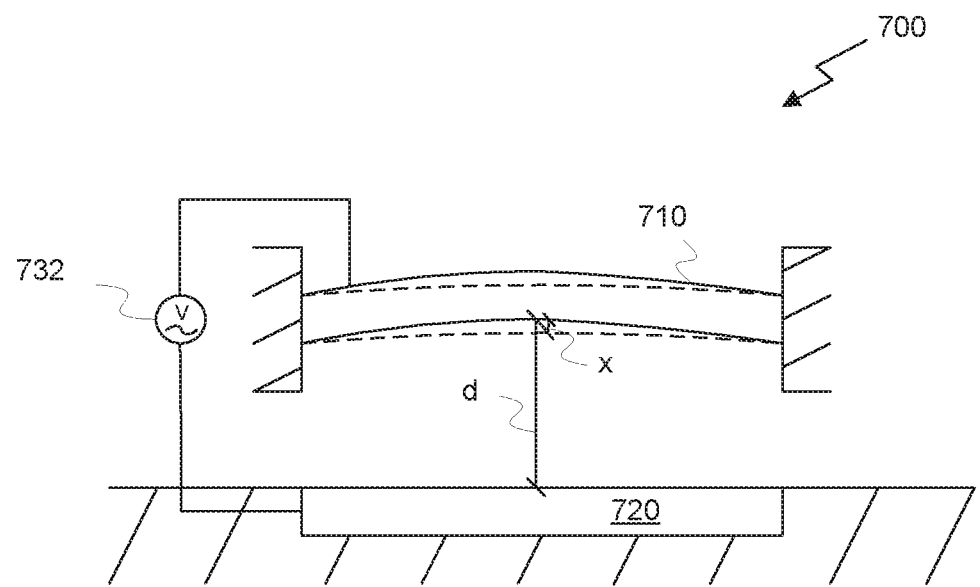
FIG. 7 illustrates a MEMS device, in accordance with some embodiments.

FIG. 7 illustrates a MEMS device 700, in accordance with some embodiments. As depicted in FIG. 7, the MEMS device 700 includes an arched microbeam 710 positioned above a stationary electrode 720. The MEMS device 700 differs from the MEMS device 500 because the relaxed state of the microbeam 710 is arched rather than straight. The MEMS device 700 can also be excited by one or more voltage sources 732. In an embodiment, a single DC voltage source 732 is coupled to the MEMS device 700. Assuming that the arched microbeam 710 is under no axial load, the dynamics of the MEMS device 700 can be modeled according to Equation 10:

$$\frac{3\rho L A_{cs}}{8}\ddot{x} + \frac{3Lc}{8}\dot{x} + \frac{2\pi^4 EI}{L^3}(x + b_0) + \frac{\pi^4 E A_{cs}^2}{8L^3}(x^2 + b_0^2)x = \frac{\varepsilon A_s V_{MEMS}^2}{4\sqrt{d(d-x)^3}}, \quad \text{(Eq. 10)}$$

where ρ is the mass density of the arched microbeam 710, L is the length of the ached microbeam 710, $A_{cs}$ is the cross-sectional area of the arched microbeam 710, x is the deflection from the equilibrium point (positive away from the electrode 720), c is the damping coefficient, E is Young's modulus of elasticity, I is the second moment of area of a straight microbeam with similar dimensions around the neutral axis of the arched microbeam 710, $b_0$ is the initial curvature, and $A_s$ is the surface area.

Assuming high damping, the first term associated with acceleration $\ddot{x}$ can be dropped and Equation 10 can be simplified to take the form of Equation 11:

$$\tau \dot{x} = -x + h_n + C_n g(x) + \Gamma(x, V_a + V_0), \quad \text{(Eq. 11)}$$

where $C_n$ is the ratio of the cubic non-linear stiffness, $k_3$, to the linear stiffness, $k_1$. The following set of equations define the parameters for Equation 11:

$$\sigma = \frac{c}{\rho A} \quad \text{(Eq. 12)}$$

$$\omega_{m1} = 22.3733 \sqrt{\frac{EI}{\rho A_{cs} L^4}} \quad \text{(Eq. 13)}$$

$$k^* = \frac{16\pi^4}{1502} \frac{\omega_{m1}^2}{\sigma^2} \quad \text{(Eq. 14)}$$

$$k_1 = k^* - b_0^2 k_3 \quad \text{(Eq. 15)}$$

$$k_3 = 0.065 b_0^2 \frac{A_{cs}}{I} \frac{\omega_{m1}^2}{k_1} \quad \text{(Eq. 16)}$$

$$\tau = \frac{\sigma}{k_1} \quad \text{(Eq. 17)}$$

$$h_n = 1.03786 \frac{h \omega_{m1}^2}{\sigma^2 g_0 k_1} \quad \text{(Eq. 18)}$$

$$C_n = -\frac{k_3}{k_1} \quad \text{(Eq. 19)}$$

$$\Gamma(x, V) = \frac{2\varepsilon b V^2}{3\rho A_{cs} \sqrt{d(d+x)^3}} \quad \text{(Eq. 20)}$$

$$s(x, t) = \frac{\Gamma(x, V_a)}{k_1} \quad \text{(Eq. 21)}$$

$$g(x) = x^3 \quad \text{(Eq. 22)}$$

In an exemplary embodiment, the MEMS device 700 is configured to include an arched microbeam 710 with a length, L, equal to 1000 μm, a width, b, equal to 30 μm, and a thickness, h, equal to 3 μm. The initial gap, d, is equal to 10.1 um, the mass density, ρ, is equal to 2330 kg/m³, a Young's modulus of 160 GPa, and a Poisson's ratio of 0.22. The initial curvature, $b_0$, is equal to 3 μm. During operation, detection instability occurs when the input voltage exceeds a snap-through threshold voltage, $V_f$, and reverse detection instability occurs when the input voltage drops below a release threshold voltage, $V_b$. Thus, by exciting the MEMS device 700 with an input voltage over the snap-through threshold voltage the MEMS device 700 moves from an OFF state to an ON state. The ON state is maintained until the input voltage drops below the release threshold voltage, which is less than the snap-through threshold voltage, thereby introducing a hysteresis during operation. These characteristics resemble a selection behavior for a single DFT neuron rate-model.

In some embodiments, the operation of the MEMS device 700 can exhibit memory behavior instead of selection behavior. To exhibit a memory behavior, the MEMS device 700 is biased with a bias voltage. The bias voltage will be more than the release threshold voltage but less than the snap-through threshold voltage. Once the MEMS device 700 is excited by an additional input voltage that, when combined with the bias voltage, exceeds the snap-through threshold voltage, the MEMS device 700 moves from the OFF state to the ON state. As the input voltage is reduced back to zero, the bias voltage remains above the release threshold voltage and the MEMS device 700 remains in the ON state.

It will be appreciated that solving Equation 10 using a conventional, CMOS-based logic device may require between 5 and 1200 floating point calculations compared to the analog operation of the MEMS device 700. In addition, the MEMS device 700 may be up to 10 times as efficient, from a power consumption standpoint, compared to the CMOS-based logic device. Consequently, a system that incorporates a number of MEMS device 700 to implement a CTRNN can save significant power as well as perform the processing at much faster speeds than comparable digital, CMOS-based logic devices.

Figure 8:
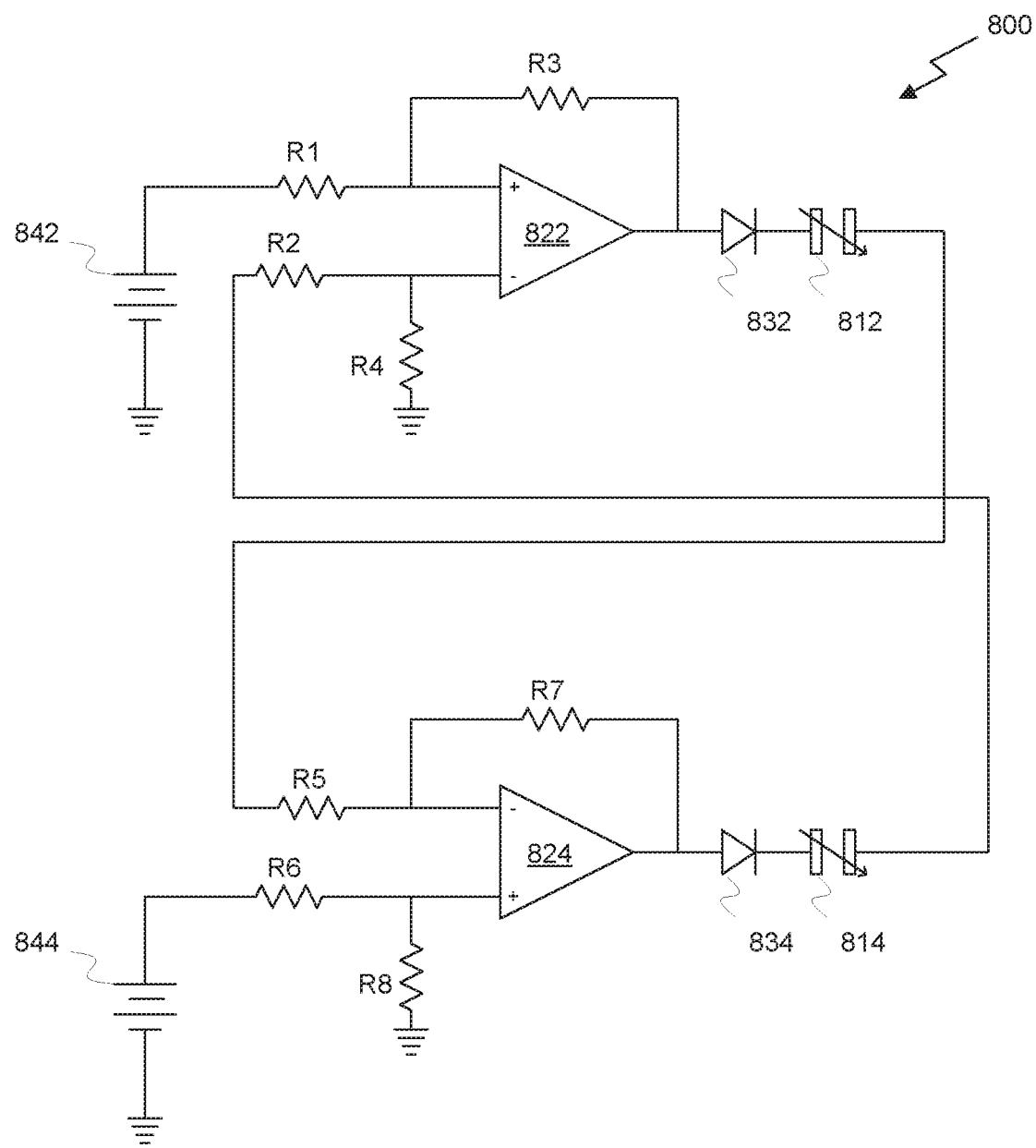
FIG. 8 illustrates an electrical circuit configured to simulate a pair of coupled CTRNs, in accordance with some embodiments.

FIG. 8 illustrates an electrical circuit 800 configured to simulate a pair of coupled DFT neurons, in accordance with some embodiments. As depicted in FIG. 8, the electrical circuit 800 includes a pair of MEMS devices 812, 814 that are isolated using op amps 822, 824 and diodes 832, 834. The MEMS devices 812, 814 are excited via voltage sources to reflect the magnitudes of inhibition and amplification in the electrical circuit 800. The electrical circuit 800 can be modeled in accordance with the following set of differential Equations:

$$\tau \dot{x}_1(t) = -x_1(t) + h_{n1} + C_{n1}g(x_1) + \mathcal{T}[x_1, V_1] \quad \text{(Eq. 23)}$$

$$\tau \dot{x}_2 = -x_2(t)h_{n2} + C_{n2}g(x_2) + \mathcal{T}[x_2, V_2] \quad \text{(Eq. 24)}$$

It will be appreciated that the external negative coupled term is a function of the MEMS device 812, 814 displacement, $x_1$ or $x_2$. The voltage across the MEMS device 812, 814 offers a feedback signal that is utilized to inhibit the other corresponding MEMS device 812, 814, thereby producing a selection mechanism behavior. During operation, both the first MEMS device 812 and the second MEMS device 814 are biased by a 20 V and 24 V bias voltage, respectively. The bias voltage is less than the snap-through threshold voltage and, as a result, is not sufficient to trigger a snap-through response of either MEMS device 812, 814. However, when an input voltage of, e.g., 90 V is provided to the first MEMS device 812, the first MEMS device 812 transitions from the OFF state to the ON state. The output voltage from the first MEMS device 812 inhibits the second MEMS device 814 through a feedback signal coupled to the negative terminal of the op amp 824. Consequently, even though an 80 V input voltage could be added to the second MEMS device 814, via the voltage source 844, the second MEMS device 814 remains in the OFF state. However, when the input voltage supplied to the first MEMS device 812 is turned off, such that the first MEMS device 812 returns to the OFF state, the second MEMS device 814 exhibits a snap-through response that causes the second MEMS device 814 to transition from the OFF state to the ON state. Again, this behavior exhibited by the coupled MEMS devices 812, 814 in the electrical circuit 800 simulates selection behavior of a pair of coupled DFT neurons.

It will be appreciated that other types of dynamics can be exhibited by the electrical circuit 800. For example, when both the first MEMS device 812 and the second MEMS device 814 are biased by a 20 V bias voltage, and the second MEMS device 814 is excited by an input voltage of 70 V while the first MEMS device 812 is not excited (e.g., input voltage equal to zero volts), a periodic orbit can emerge where a snap-through response of the second MEMS 814 is configured to excite the first MEMS device 812, which causes a snap-through response of the first MEMS device 814 that inhibits the second MEMS device 814. The second MEMS device 814 returns to the OFF state, which removes the excitation signal provided to the first MEMS device 812, which causes the first MEMS device 812 to transition from the ON state to the OFF state. This cycle is repeated while the input voltage to the second MEMS device 814 remains high and the input voltage to the first MEMS device 812 remains low, causing the continuous repetition that produces a periodic orbit. The fluctuation of the deflection in the first MEMS device 812 and the second MEMS device 814 may not be equal.

Figure 9A:
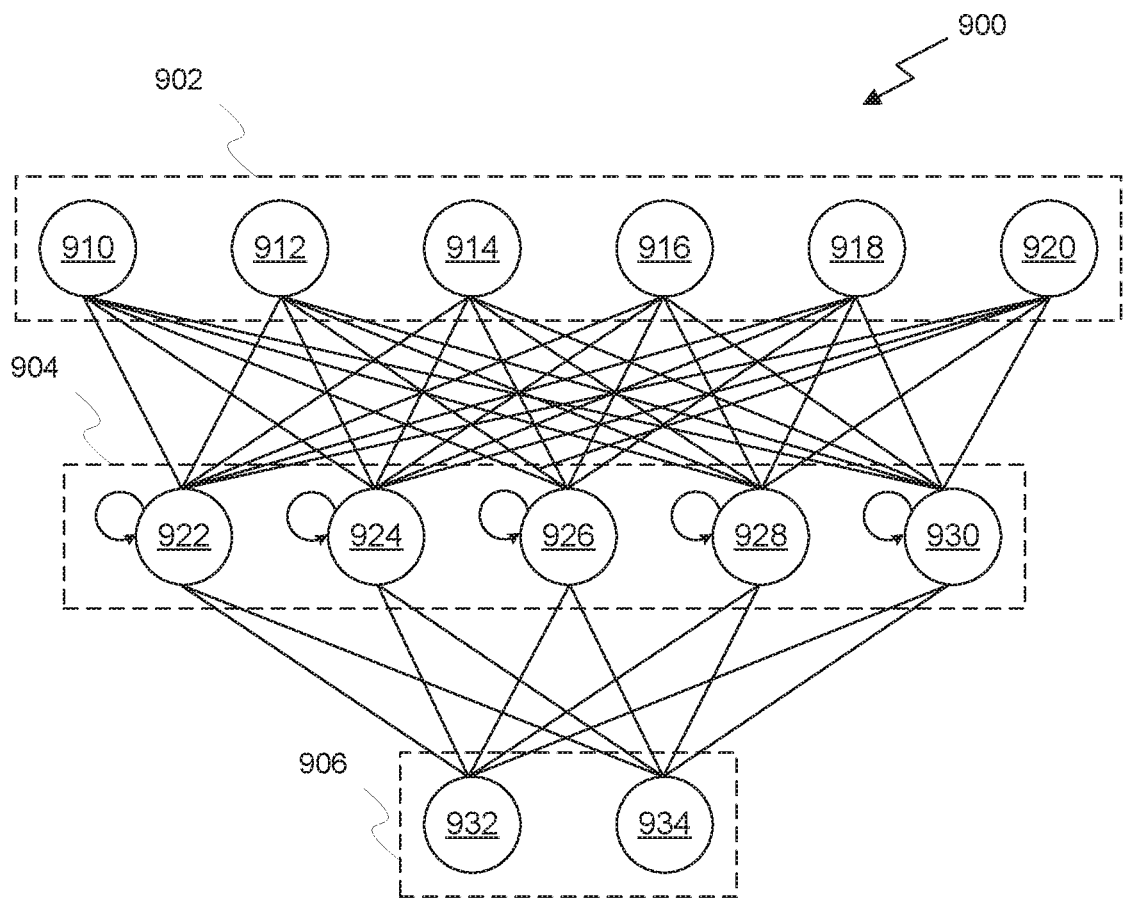
FIG. 9A illustrates a CTRNN implemented using a number of MEMS devices, in accordance with some embodiments.

FIG. 9A illustrates a CTRNN 900 implemented using a number of MEMS devices, in accordance with some embodiments. In some embodiments, the CTRNN 900 can be implemented on a substrate such as a die of a silicon wafer. Each of the MEMS devices can be formed in or on the substrate using well-known techniques for manufacturing MEMS devices. In addition, various circuit components or elements such as resistors, capacitors, inductors, and the like can be formed in or on the substrate as well. In other embodiments, a die containing the MEMS devices can be mounted in a package and connected, via wire bonding, flip-chip technology, or other well-known connection means, to a circuit implemented on a separate substrate or printed circuit board.

In some embodiments, the CTRNN 900 includes a number of layers including a sensor layer 902, a recurrent neural layer 904, and an output layer 906. The sensor layer 902 includes a number of MEMS devices 910, 912, 914, 916, 918, 920 configured to exhibit a detection behavior for a particular sensory input. For example, the sensor layer 902 could include MEMS devices such as accelerometers, gyroscopes, pressure sensors, magnetic field sensors, tilt sensors, light sensors, humidity sensors, temperature sensors, microphones, and the like. Each of the sensors can be configured to generate a signal based on a level of the detected sensory input measured by the MEMS device. In general, each sensor produces an activation level that corresponds to an OFF state or an ON state based on whether the detected sensor input is below or above a threshold value related to the bi-stability of the MEMS device.

The activation levels of the MEMS devices for the sensor layer 902 are connected to the MEMS devices 922, 924, 926, 928, 930 of the recurrent neural layer 904. Each of the connections shown between a MEMS device of the sensor layer 902 and a corresponding MEMS device of the recurrent neural layer 904 is associated with a connection coefficient (e.g., a weight) that is used to attenuate the activation level output by the MEMS device in the sensor layer 902. In some embodiments, the activation level is connected to a circuit including an op amp configured with a particular gain in order to implement the desired attenuation of the activation level. The gain of the op amp can be configured using various techniques well-known in the art, such as using particular combinations of resistors in a closed feedback arrangement to tailor the gain to a desired level. In other embodiments, the activation level is connected to a circuit that applies a bias to the proof mass of the MEMS device in order to implement the desired level of attenuation on the activation level from the sensor layer 902, as will be discussed in more detail below.

Each of the MEMS devices 922, 924, 926, 928, 930 in the recurrent neural layer 904 implements a CTRN 400 as depicted in FIG. 4. The connections from the sensor layer 902 provide inputs to the signal adder 420. In addition, the signal adder 420 also receives input through the self-excitation feedback loop (e.g., the activation level $\sigma(y_i)$, attenuated by connection coefficient $w_{ii}$) and additional input $I_i$ from the threshold sensor of the MEMS device. It will be appreciated that the recurrent neural layer 904 is depicted as a fully connected layer where every MEMS device in the recurrent neural layer 904 is connected to each MEMS device in the sensor layer 902. However, in some embodiments, each MEMS device in the recurrent neural layer 904 may be connected to fewer than all of the MEMS devices (e.g., a subset of MEMS devices).

Furthermore, although not shown explicitly, each MEMS device in the recurrent neural layer 904 can also be coupled to one or more other MEMS devices in the recurrent neural layer 904. For example, the activation level of one MEMS device can act as an inhibitory signal coupled to another MEMS device within the recurrent neural layer 904. This coupling can enable two or more MEMS devices to exhibit selection behavior similar to that described in conjunction with the description of FIG. 3, set forth above.

It will be appreciated that the number of MEMS devices in the recurrent neural layer 904 can vary from the number shown in FIG. 9. In addition, the recurrent neural layer 904 can be further subdivided into two or more hidden layers. As used herein, a hidden later refers to a layer in a plurality of recurrent neural layers 904 between the sensor layer 902 and the output layer 906. In other words, outputs from a first set of MEMS devices in a first hidden layer can be connected to inputs of a second set of MEMS devices in a second hidden layer, and so forth until outputs from a final set of MEMS devices in a final hidden layer are connected to the MEMS devices in the output layer 906.

In an embodiments, the output layer 906 includes one or more MEMS devices configured to combine the activation levels received from the outputs of the recurrent neural layer 904 to generate activation level(s) as the output of the CTRNN 900. The activation levels of the output layer 906 can represent actuator control signals (e.g., motor ON/OFF commands, speed commands, etc.), classification identifiers (e.g., bit fields that specify a category associated with the input such as identifying whether a person is falling, walking, moving up or down stairs, etc.), and the like.

In some embodiments, the CTRNN 900 can be trained by adjusting the connection coefficients between the MEMS devices. In order for training to be dynamic, then the gains must be adjustable by, e.g., adjusting resistance values associated with op amp circuits, adjusting bias voltage levels, adjusting excitation frequencies, and so forth. In other embodiments, the connection coefficients and/or bias levels may be fixed. In such cases, the CTRNN 900 can be simulated by training a RNN implemented in a conventional digital computer, and the estimates for the weights and/or bias values derived during training of the RNN can be used to configure the CTRNN 900. Once configured, the CTRNN 900 can then be applied to novel sensory inputs to derive outputs in accordance with the fixed connection coefficients and bias voltages.

In some embodiments, the sensor layer 902 and the recurrent neural layer 904 can be combined. Since each MEMS device inherently measures a sensory input that is combined with the activation signals from other MEMS devices, the sensor function of the MEMS devices in the sensor layer 902 can be implemented directly in one or more of the MEMS devices that are configured to execute the computing function of the CTRNN 900. This can simplify the CTRNN 900 in certain cases where the number of MEMS devices required to implement a specific function is small and eliminates the need for signal conversion.

Figure 9B:
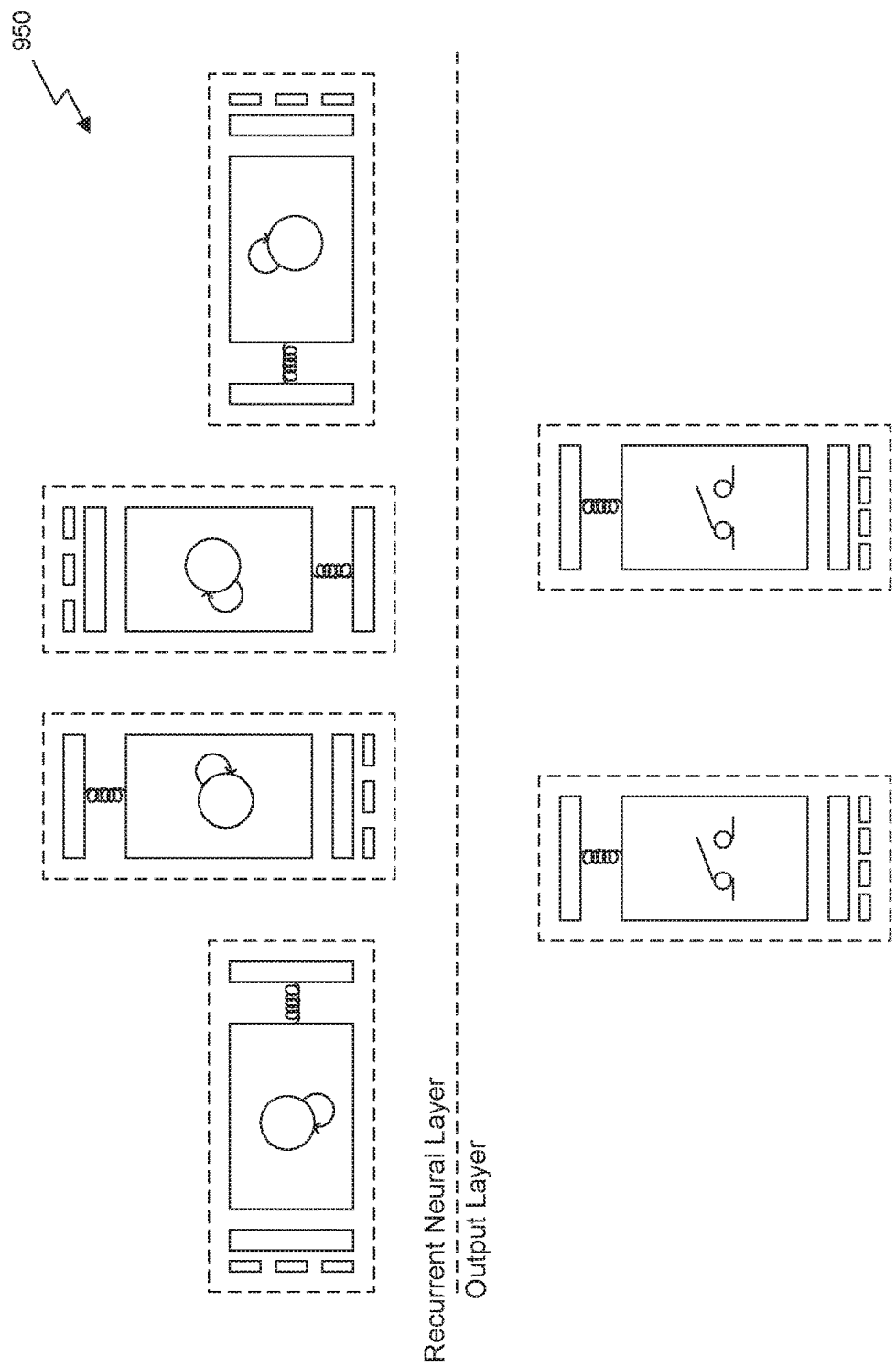
FIG. 9B illustrates a CTRNN where the sensor layer and the recurrent neural layer are combined, in accordance with an embodiment.

FIG. 9B illustrates a CTRNN 950 where the sensor layer 902 and the recurrent neural layer 904 are combined, in accordance with an embodiment. The recurrent neural layer of the CTRNN 950 includes four MEMS accelerometers, two MEMS accelerometers are configured to measure acceleration in an x-axis and two MEMS accelerometers are configured to measure acceleration in a y-axis, measuring acceleration relative to a threshold acceleration in each of a positive and negative direction along each axis. The MEMS accelerometers provide a sensing functionality of the acceleration in two axes. Each MEMS accelerometer is also coupled to a signal of the other MEMS accelerometers in the recurrent neural layer. The coupled signals provide a computation functionality whereby the dynamics of the MEMS accelerometers and the implementation of the connection coefficients associated with each signal (e.g., activation level) simulate the computation of a set of differential equations.

The activation levels of each of the MEMS accelerometers in the recurrent neural layer of the CTRNN 950 are also coupled to MEMS devices in the output layer of the CTRNN 950. Each of the MEMS devices in the output layer generates an output signal (e.g., an activation level) that represents an output of the CTRNN 950. In an embodiment, each of the MEMS devices in the output layer can control an actuator, such as a signal for a stepper motor. In other words, the actuator can be controlled directly based on the activation levels of the MEMS devices in the output layer of the CTRNN 950.

It will be appreciated that the number of MEMS accelerometers in the recurrent neural layer and/or the number of MEMS devices in the output layer can be increased or decreased depending on the application. For example, additional MEMS accelerometers can be added to measure acceleration in along a z-axis or additional MEMS devices can be added to control motor steps and direction for each of multiple actuators. However, it will be appreciated that the MEMS accelerometers in the recurrent neural layer of the CTRNN 950 provide both sensing and processing functionality of the sensor layer 902 and the recurrent neural layer 904 of the CTRNN 900, as depicted in FIG. 9A.

Again, as discussed above, in order to train a CTRNN 900 to perform a specific task, the CTRNN 900 can be trained according to a set of training data. The set of training data can include pairs of inputs and target outputs corresponding to the inputs. The number of pairs of training data can be numbered in the thousands or hundreds of thousands. As the CTRNN 900 generates an output corresponding to the input from the pair of training data set, the output can be compared to the target output by a loss function and the value of the loss function can be used to adjust the connection coefficients and/or bias voltages associated with each MEMS device. Adjusting the resistance values and/or bias voltages associated with an op amp circuit is one technique that effectively changes the gain associated with the op amps in order to tailor a connection coefficient associated with a specific connection between two MEMS devices. However, a different embodiment that uses fingers connected to a proof mass of the MEMS device is another technique that can effectively change the connection coefficient.

Figure 10:
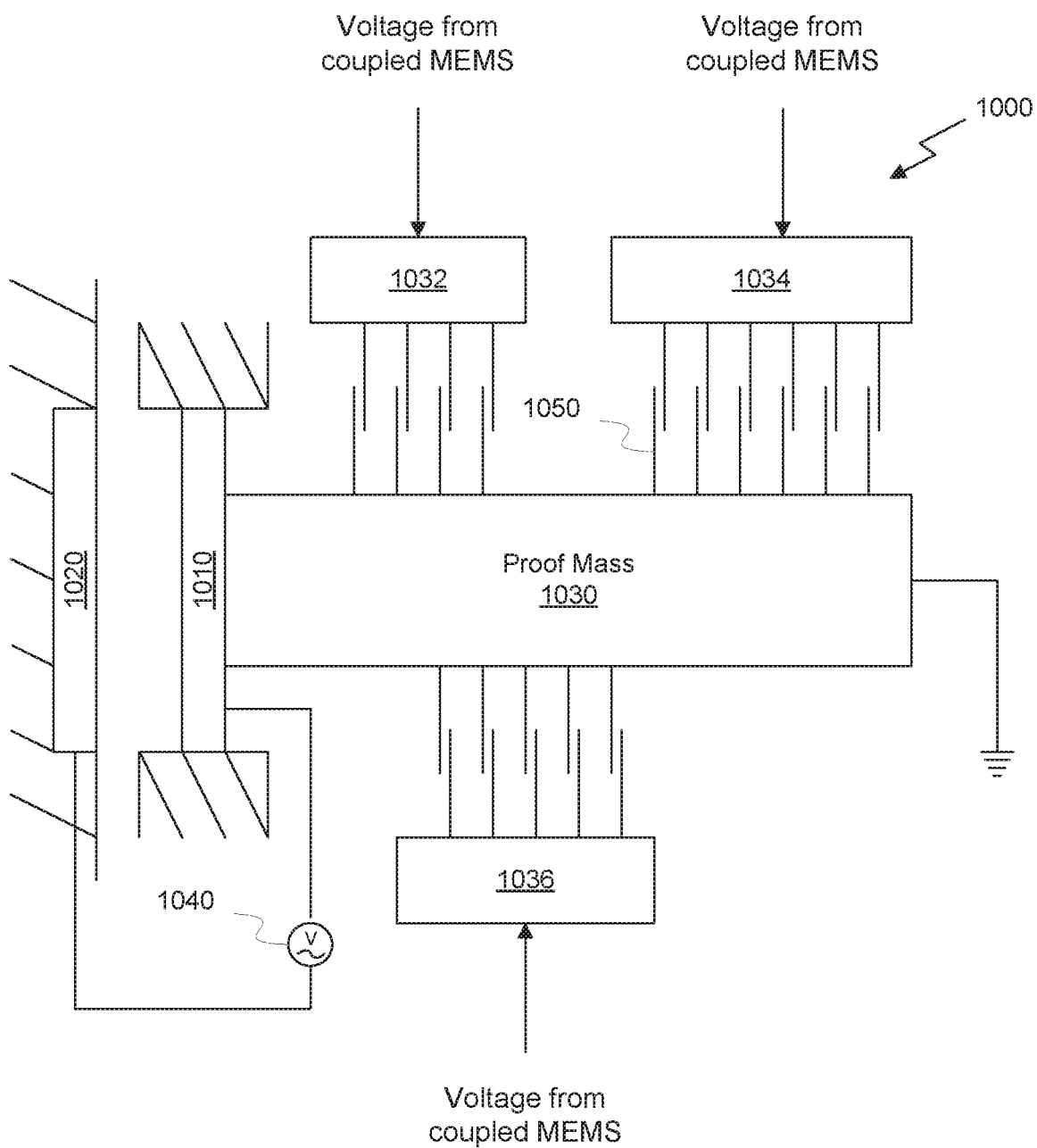
FIG. 10 illustrates a technique to adjust the bias level of a MEMS device, in accordance with some embodiments.

FIG. 10 illustrates a technique to adjust the actuation voltage of a MEMS device 1000, in accordance with some embodiments. As depicted in FIG. 10, the MEMS device 1000 includes a microbeam 1010 and an electrode 1020. A voltage source 1040 is coupled to the microbeam 1010 and the electrode 1020. The microbeam 1010 is also coupled to a proof mass 1030. The proof mass 1030 changes the dynamics of the microbeam 1010 by changing the inertia of the microbeam 1010.

In an embodiment, the proof mass also has a number of fingers 1050 that extend perpendicularly to the natural axis of motion of the proof mass 1030. The fingers 1050 can also be referred to as a comb structure or comb-fingers. A corresponding finger coupled to a conductive structure in the substrate is disposed adjacent to and/or in between the fingers 1050 coupled to the proof mass 1030. Multiple sets of fingers can be coupled to the proof mass 1030, each set associated with a different conductive structure.

In operation, the conductive structures 1032, 1034, 1036 are connected to activation levels (e.g., voltages) output from other MEMS devices coupled to the MEMS device 1000. The proof mass 1030 is connected to ground. Consequently, any voltage connected to the conductive structures 1032, 1034, 1036 will establish an electrostatic force between a finger coupled to the conductive structures 1032, 1034, 1036 and a corresponding finger coupled to the proof mass 1030. The force biases the microbeam 1010 and changes the threshold voltage required across the MEMS device 1000 in order to transition from the OFF state to the ON state. By coupling different signals from different MEMS devices to separate and distinct conductive structures that interact with different groups of fingers coupled to the proof mass 1030, the total bias amount applied to the MEMS device 1000 can be controlled. In addition, by varying the number of fingers associated with each of the conductive structures, each of the voltages can be attenuated by a variable gain related to the number of fingers. Alternatively, the amount of overlap of each finger can be varied to adjust the gain as the relative amount of overlap of the surface area between corresponding fingers adjusts the electrostatic force applied for a given voltage.

It will be appreciated that the proof mass included in each MEMS device in the plurality of MEMS devices in the CTRNN does not have to be constant. In some embodiments, the threshold associated with a transition of each signal from an OFF state to an ON state can be controlled by adjusting the proof mass associated with each MEMS device configured to generate the corresponding signal.

It will also be appreciated that CTRNs were implemented such that the system retains the memory of previous inputs by introducing recurrent connections through the self-excitation feedback loop. However, RNNs are simply special cases of a CTRNN where the governing equations are discretized in time and artificial neural networks (ANNs) are special cases of CTRNNs, which means that the CTRNNs described above are capable of performing the tasks associated with simpler neural networks by tweaking the parameters of the MEMS device. For example, a MEMS CTRNN can operate similar to a MEMS ANN by operating the MEMS devices outside of the bi-stability range (e.g., using a straight microbeam with DC excitation signal under low voltage where the microbeam does not experience collapse under pull-in/pull-out behavior).

Figure 11:
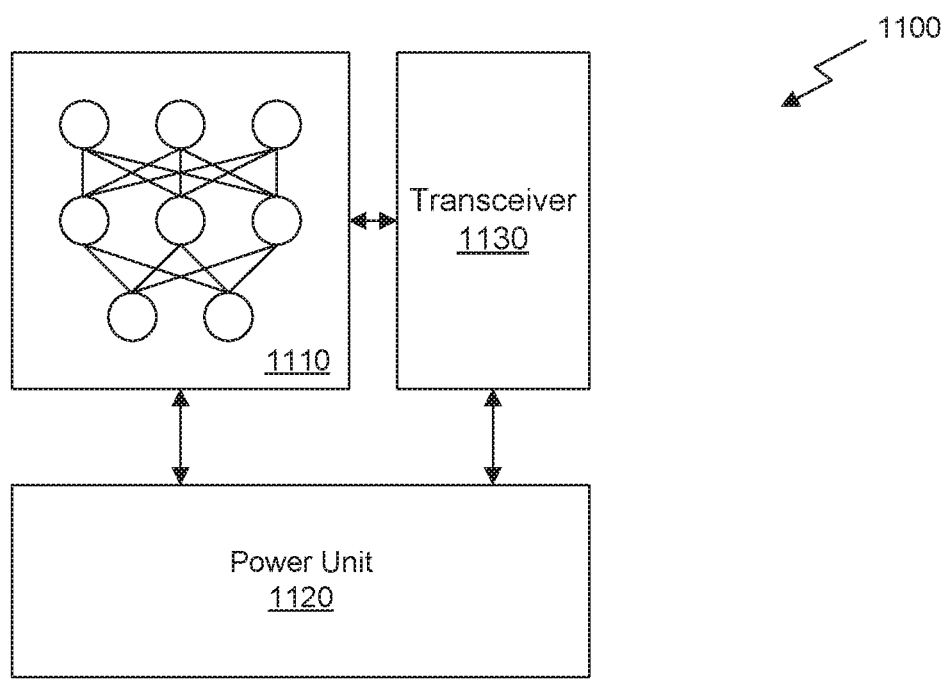
FIG. 11 illustrates a wireless mesh network (WMN) node that includes a MEMS-based CTRNN, in accordance with some embodiments.

FIG. 11 illustrates a wireless mesh network (WMN) node 1100 that includes a MEMS-based CTRNN 1110, in accordance with some embodiments. It will be appreciated that many devices are designed for the Internet of Things (IoT). Each device can communicate with a network and may include sensors and a means for processing such as an ARM processor or microcontroller. The devices may generate data packets that are transmitted over the network, and can be used to communicate with a user through a mobile device such as a phone or to control other devices such as a home heating, ventilation, and air conditioning (HVAC) system. However, many of these devices could benefit from reducing the complexity of the device.

In some embodiments, the conventional processing apparatus in a WMN node 1000, such as the CPU or microcontroller, can be replaced with the processing capability of the MEMS-based CTRNN 1110. Rather than having sensors that generate input signals, which are then digitized for processing by a processor or microcontroller, the CTRNN 1110 can generate and process the input, via the techniques described above, and then transmit the output signals over the network via a transceiver 1130. The power unit 1120 operates as a power supply for the CTRNN 1110 and transceiver 1130 and can generate multiple voltage sources for utilization as bias voltages and/or excitation signals for the MEMS devices in the CTRNN 1110. By moving the processing out of the conventional processor/microcontroller and into the CTRNN 1110, the energy consumption can sometimes be reduced significantly.

Although FIG. 11 only shows one node in a WMN, it will be appreciated that multiple nodes can exist and communicate within the WMN, sharing data and accomplishing a variety of different tasks. For example, people in a building can each be given wearable devices (e.g., wrist-bands, smart watches, etc.) that help track the location and/or environmental conditions around the people. The data sent from the wearable device to other nodes in the wireless mesh network can provide inputs to controllers for devices like lighting systems, HVAC systems, security systems, and the like. As another example, a vehicle can be outfitted with a number of different devices to track conditions associated with the different sub-systems of the vehicle. A master controller can communicate with the plurality of wireless nodes to receive data about each of the sub-systems in the vehicle.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A continuous-time recurrent neural network (CTRNN), comprising:
   a Micro-Electro-Mechanical Systems (MEMS) device that includes an electrode and a microbeam offset from the electrode, wherein the MEMS device is associated with non-linear dynamics that cause the MEMS device to exhibit a bi-stable response to an input signal;
   a voltage source connected to the MEMS device and configured to apply a bias voltage to the MEMS device; and
   an operational amplifier (op amp) and at least one resistor configured to adjust a gain associated with a signal connected to the op amp, wherein the signal comprises an activation level associated with a second MEMS device, and the gain is configured to attenuate the signal to approximate a connection coefficient corresponding to a connection between the MEMS device and the second MEMS device.

2. The CTRNN of claim 1, wherein the microbeam is a cantilevered microbeam and the voltage source is configured to apply an alternating current (AC) voltage to the MEMS device at a frequency proximate an electrical resonance frequency associated with the MEMS device.

3. The CTRNN of claim 2, wherein a frequency response of the MEMS device corresponding to the AC voltage at the frequency has a gain of at least 20 decibels.

4. The CTRNN of claim 1, wherein the microbeam is an arched microbeam and the voltage source is configured to apply a direct current (DC) voltage to the MEMS device.

5. The CTRNN of claim 1, further comprising:
   a proof mass coupled to the microbeam, wherein the proof mass includes a number of fingers attached thereto; and
   one or more conductive structures having corresponding sets of fingers attached thereto, wherein the corresponding sets of fingers for each conductive structure in the one or more conductive structures are disposed proximate to a subset of fingers attached to the proof mass.

6. The CTRNN of claim 5, wherein each conductive structure is connected to a corresponding signal that represents an activation level for a separate MEMS device in one or more additional MEMS devices.

7. The CTRNN of claim 6, wherein each additional MEMS device includes a proof mass, and the gain associated with the signal for a particular additional MEMS device is based on a number of fingers for the particular additional MEMS device.

8. The CTRNN of claim 1, further comprising a sensor layer, a recurrent neural layer, and an output layer, and wherein the MEMS device is included in the recurrent neural layer.

9. The CTRNN of claim 8, wherein the MEMS device is connected to an input signal from at least one additional MEMS device included in the sensor layer, and an output signal of the MEMS device is connected to at least one further MEMS device included in the output layer.

* * * * *